United States Patent
Stretton et al.

(10) Patent No.: US 9,809,317 B2
(45) Date of Patent: Nov. 7, 2017

(54) ENGINE MOUNT

(71) Applicant: ROLLS-ROYCE PLC, London (GB)

(72) Inventors: Richard Geoffrey Stretton, Loughborough (GB); Kenneth Franklin Udall, Ilkeston (GB)

(73) Assignee: ROLLS-ROYCE plc, London (GB)

( * ) Notice: Subject to any disclaimer, the term of this patent is extended or adjusted under 35 U.S.C. 154(b) by 344 days.

(21) Appl. No.: 14/543,402

(22) Filed: Nov. 17, 2014

(65) Prior Publication Data
US 2016/0167797 A1 Jun. 16, 2016

(30) Foreign Application Priority Data
Dec. 13, 2013 (GB) .................................. 1322077.7

(51) Int. Cl.
*B64D 27/26* (2006.01)
*F02C 7/20* (2006.01)
*B64D 27/10* (2006.01)

(52) U.S. Cl.
CPC .............. *B64D 27/26* (2013.01); *B64D 27/10* (2013.01); *F02C 7/20* (2013.01);
(Continued)

(58) Field of Classification Search
CPC ...... B64D 27/26; B64D 27/262; B64D 27/10; B64D 27/12; B64D 27/16; B64D 27/00;
(Continued)

(56) References Cited

U.S. PATENT DOCUMENTS

| 1,840,902 A | 1/1932 | Hicks |
| 2,355,370 A | 8/1944 | Frey |

(Continued)

FOREIGN PATENT DOCUMENTS

| DE | 767 091 C | 10/1951 |
| EP | 2 441 673 A2 | 4/2012 |
| FR | 2 976 914 A1 | 12/2012 |

OTHER PUBLICATIONS

Google, "parallel" definition; https://www.google.com/search?q=parallel, accesssed Jan. 4, 2017.*

(Continued)

*Primary Examiner* — Tien Q Dinh
*Assistant Examiner* — Alexander V. Giczy
(74) *Attorney, Agent, or Firm* — Oliff PLC

(57) ABSTRACT

An aircraft including a pylon attached to a gas turbine engine and a mounting system attaching the engine to the pylon. The mounting system including a first and a second frame each of three elongate members arranged in a triangle, each frame respectively arranged such that a core of the engine is positioned extending through an area defined between the three elongate members of each frame. Each frame forming at least part of a load bearing connection between the pylon and the engine. Each frame consisting of two portions, each portion corresponding to each side of the engine as attached to the pylon. The triangle formed by each frame being symmetrical about a plane separating the two portions. The engine is attached to the mounting system such that both frames are positioned axially forward of a radially extending projection of a first turbine stage in the core.

12 Claims, 2 Drawing Sheets

Figure 1:
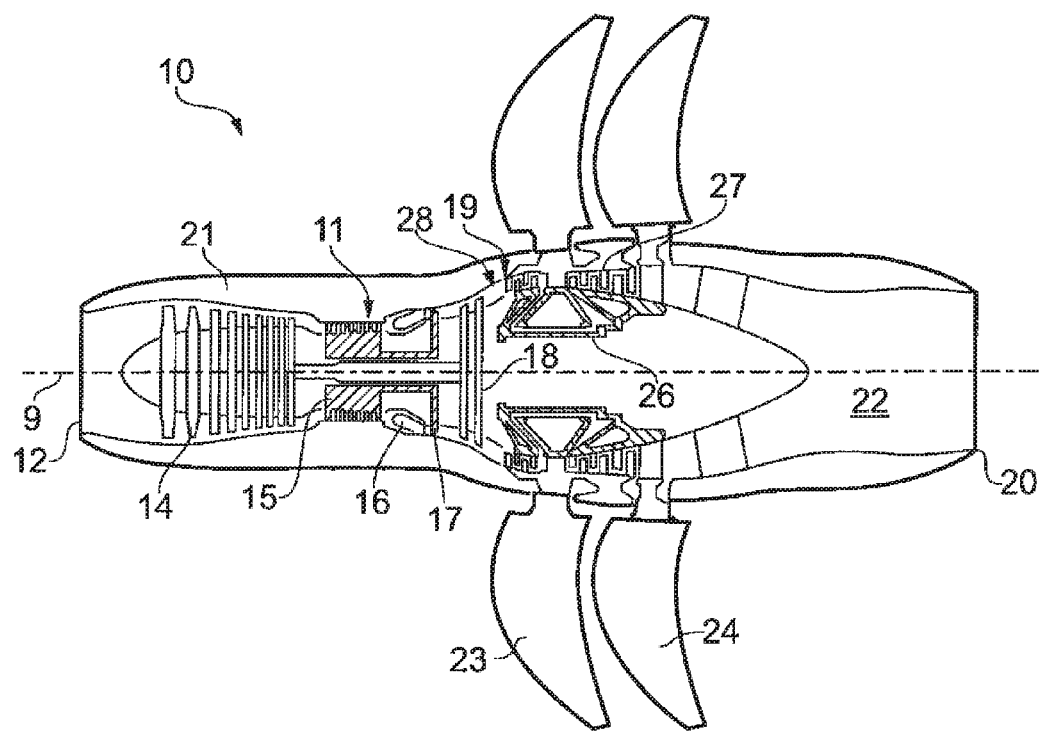

(52) U.S. Cl.
CPC .. *B64D 2027/262* (2013.01); *F05D 2220/325* (2013.01); *F05D 2250/11* (2013.01)

(58) Field of Classification Search
CPC ........ B64D 2027/264; B64D 2027/262; B64D 27/18; F02C 7/20
See application file for complete search history.

(56) References Cited

U.S. PATENT DOCUMENTS

| | | | |
|---|---|---|---|
| 2,738,647 A | | 3/1956 | Hill |
| 2,931,601 A | | 4/1960 | Johnson |
| 5,443,229 A | * | 8/1995 | O'Brien ................. B64D 27/20 244/54 |
| 5,474,258 A | * | 12/1995 | Taylor .................... B64D 27/26 244/54 |
| 8,444,085 B2 | * | 5/2013 | Stretton ................. B64D 27/12 244/54 |
| 2008/0067287 A1 | * | 3/2008 | Guibert .................. B64D 27/26 244/54 |
| 2008/0105782 A1 | | 5/2008 | Beardsley |
| 2009/0090811 A1 | * | 4/2009 | Llamas Sandin ...... B64D 27/14 244/54 |
| 2009/0255271 A1 | * | 10/2009 | Vauchel ................. B64D 29/00 60/797 |
| 2010/0047066 A1 | * | 2/2010 | Derenes Jacky ....... F01D 25/24 415/201 |
| 2010/0176239 A1 | * | 7/2010 | Marche .................. B64D 27/12 244/54 |
| 2012/0051903 A1 | * | 3/2012 | Heyerman ............. B64D 27/20 415/213.1 |
| 2012/0104162 A1 | * | 5/2012 | West ..................... B64C 1/1453 244/54 |
| 2013/0014515 A1 | | 1/2013 | Bellabal et al. |
| 2014/0130512 A1 | | 5/2014 | Chouard et al. |
| 2016/0032837 A1 | * | 2/2016 | Eleftheriou ........... F01D 25/162 60/772 |

OTHER PUBLICATIONS

Wikipedia, "Plane (geometry)"; https://en.wikipedia.org/wiki/Plane_(geometry), accessed Jan. 4, 2017.*
Wikipedia, "Dead centre (engineering)"; https://en.wikipedia.org/wiki/Dead_centre_(engineering); accessed Jan. 5, 2017.*
Apr. 9, 2015 Search Report issued in European Application No. 14 19 3372.
Jul. 24, 2014 Search Report issued in British Application No. 1322077.7.

* cited by examiner

ENGINE MOUNT

The present invention relates to engine mounts for aircraft. More specifically the invention relates to a mounting system, a gas turbine engine and an aircraft. The invention may have particular non-limiting application to the mounting of an open rotor engine to a pylon extending from the body of an aircraft (e.g. where the pylon extends substantially horizontally from the rear of the fuselage).

According to a first aspect of the invention there is provided a mounting system optionally arranged in use for attaching a gas turbine engine to a pylon of an aircraft, the mounting system optionally comprising a first frame of three elongate members optionally arranged in a triangle, where the first frame is optionally arranged in use such that a core of the gas turbine engine is positioned extending through the area defined between the three elongate members and optionally the first frame forms at least part of a load bearing connection between the pylon and gas turbine engine, the first frame optionally consisting of two portions, one corresponding to each side of the gas turbine engine when attached to the pylon and optionally the triangle being symmetrical about a plane separating the two portions of the first frame.

In some embodiments the mounting system is arranged such that in use it allows the gas turbine engine to be alternately mounted to pylons extending from left and right hand sides of the aircraft without replacing the mounting system. In particular the symmetry of the first frame (and optionally other components as discussed further below) with respect to the mounting orientation of the gas turbine engine may facilitate interchange between left and right hand attachment.

In some embodiments the plane separating the two portions of the first frame is the same as the plane passing through the gas turbine engine top and bottom dead centres and extending parallel to the rotating axis of the gas turbine engine. This may be advantageous where the mounting orientation of the gas turbine engine is such that a line between top and bottom dead centre is vertical and/or where this line would have equal and opposite angles with respect to vertical on left and right hand sides of the aircraft.

In some embodiments the plane separating the two portions of the first frame passes through a vertex of the triangle formed by the three elongate members of the first frame.

In some embodiments the three elongate members of the first triangle are arranged in an isosceles triangle.

In some embodiments the three elongate members of the first triangle are arranged in an equilateral triangle.

In some embodiments the first frame is oriented in use so as it is parallel to a plane perpendicular to the main rotational axis of the gas turbine engine.

In some embodiments the mounting system further comprises a second frame of three elongate members arranged in a triangle, the second frame being arranged in use such that the core of the gas turbine engine is positioned extending through the area defined between the three elongate members and the second frame forms at least part of a load bearing connection between the pylon and gas turbine engine, the second frame consisting of two portions, one corresponding to each side of the gas turbine engine when attached to the pylon and the triangle being symmetrical about a plane separating the two portions of the second frame. The provision of the second frame may provide a second mounting location (and therefore couple transfer by offset shear force, load sharing and/or redundancy in the event of partial failure) for the mounting system and pylon.

In some embodiments the second frame may have any and/or all of the same properties as the first frame.

In some embodiments the first and second frames are axially separated and oriented parallel to each other. In particular, when in use the first and second frames may be perpendicular to the main rotational axis of the gas turbine engine. Arrangement of the first and second frames as described above may create a relatively large area between the frames. This area may accommodate components of the gas turbine engine (such as a gearbox) and/or may provide easier access to the core of the gas turbine engine (e.g. for maintenance) past the mounting system.

The second frame may be positioned forward of the first frame in the axial direction. The first and second frames may also be aligned with one another. In particular the vertices of the first and second frames may be axially aligned with one another, having the same clocking angle.

In some embodiments the mounting system further comprises a first elongate spar extending from the pylon and arranged in use to be attached to one of the elongate members of the first frame.

In some embodiments the first elongate spar extends in a direction parallel to the elongate member of the first frame with which it is arranged to be attached when the gas turbine engine is in the orientation intended for mounting to the pylon.

In some embodiments the first elongate spar is arranged to contact the elongate member of the first frame with which it is arranged to be attached along substantially the whole length of the elongate member. Further the elongate member and/or the elongate spar may be provided with one or more cooperating attachment formations. The cooperating formations may be spread along substantially the whole length of the elongate member or may be concentrated, for instance at the lower and upper vertices of the first frame.

In some embodiments the mounting system is arranged such that the first frame can be lowered vertically directly from its position when mounted with the first elongate spar to disengage it therefrom, and further that the first frame can be raised vertically from directly below its position when mounted with the first elongate spar to engage it therewith. It may be for example that the pylon extends substantially horizontally and that further optionally the spar is angled with respect to the pylon extending with dihedral therefrom and the first frame being arranged to be mounted to an underside of the spar. Vertical disengagement and engagement may simplify the mounting and dismounting of the gas turbine engine. In particular the equipment used to support and manipulate the gas turbine may be simplified and the time and space required for mounting and dismounting reduced.

In some embodiments the mounting system further comprises a second elongate spar extending from the pylon and arranged in use to be attached to one of the elongate members of the second frame. Mounting at a second location as facilitated by the second elongate spar and second frame allows couples about either frame to be resolved as separated shear forces. Such mounting may further facilitate load sharing and redundancy in the event of failure of the load path through one or other of the first and second frames.

The second elongate spar may have any and/or all of the same properties as the first spar. Further the second spar and second frame may have the same vertical mounting and dismounting capability as mentioned above with respect to the first frame and first spar.

In some embodiments the first and second spars are axially separated and parallel. The spars may be substantially identical. Further the spars may be axially separated by the same distance as the axial separation between the first and second frames, thereby simplifying engagement of the respective spar with its frame.

In some embodiments the first and second frames are linked by cross-members. The cross-members may extend between and join at corresponding vertices of the first and second frames.

In some embodiments one or more bracing members are provided extending between and joining at non-corresponding vertices of the first and second frames.

In some embodiments the mounting system is arranged so that in use the attachment of the gas turbine engine to the mounting system is such that at least one of the first and second frames is positioned axially forward of a radially extending projection of a first turbine stage in the gas turbine engine core. This may reduce the likelihood of compromise to the relevant frame or frames in the event of a turbine disc burst or other turbine damage.

In some embodiments the mounting system is arranged so that in use the attachment of the gas turbine engine to the mounting system is such that at least one of the first and second frames is positioned axially rearward of a radially extending projection of a final compressor stage in the gas turbine engine core. It may be for example that one or both of the first and second frames are substantially aligned with a combustor of the gas turbine engine core. This may reduce the likelihood of compromise to the relevant frame or frames in the event of a compressor disc burst or other compressor damage.

In some embodiment the mounting system is arranged so that in use the attachment of the gas turbine engine to the mounting system is such that the second frame is positioned axially forward of a radially extending projection of a first compressor stage in the gas turbine engine core. This may increase the mutual leverage distance between the first and second frames for reduced couple loads.

In some embodiment the mounting system is arranged so that in use the attachment of the gas turbine engine to the mounting system is such that at least one of the first and second frames is positioned so as to be outside of a burst trajectory for one, some or all of the discs in the gas turbine engine core. Each burst trajectory may for example be defined as falling outside of a pair of right-circular cones that have coincident apexes, have an axis of rotational symmetry common to the axis of rotation for the disc in question and each being symmetrical with respect to the other about a plane passing through the coincident apexes and perpendicular to the axis of rotation for the disc in question. Each cone may have a side wall that makes an angle of approximately 3°, 5° or 15° with the plane perpendicular to the axis of rotation for the disc in question.

In some embodiments frame links extend from the vertices of the first frame and are arranged in use to attach the mounting system to the core of the gas turbine engine. The attachment to the core may be at spoke ends of a main spoked structure of the core located aft of a radially extending projection of a final turbine stage. Additionally or alternatively the attachment may be outside of a burst trajectory for one, some or all of the discs in the gas turbine engine core.

In some embodiments two frame links extend from each vertex of the first frame, each converging with a frame link from another vertex to meet at a joint arranged in use to be attached to the core of the gas turbine. This arrangement may mean that there are three circumferentially spaced joints, the spacing reducing the likelihood of simultaneous joint damage in the event of a failure of the gas turbine engine. Loss of up to two joints would leave a remaining axial, side and vertical load path via the remaining joint. Articulation about the remaining joint would be snubbed by contact of the core with the elongate members of the first and/or second frame.

According to a second aspect of the invention there is provided a gas turbine engine optionally comprising a mounting system arranged in use for attaching the gas turbine engine to a pylon of an aircraft, the mounting system optionally comprising a first frame of three elongate members optionally arranged in a triangle, where the first frame is optionally arranged so that a core of the gas turbine engine is positioned extending through the area defined between the three elongate members and optionally so that in use the first frame forms at least part of a load bearing connection between the pylon and gas turbine engine, the first frame optionally consisting of two portions, one corresponding to each side of the gas turbine engine when attached to the pylon and optionally the triangle being symmetrical about a plane separating the two portions of the first frame.

In some embodiments the gas turbine engine is an open rotor engine.

According to a third aspect of the invention there is provided an aircraft comprising a gas turbine engine according to the second aspect.

The skilled person will appreciate that a feature described in relation to any one of the above aspects of the invention may be applied mutatis mutandis to any other aspect of the invention.

Figure 2A:
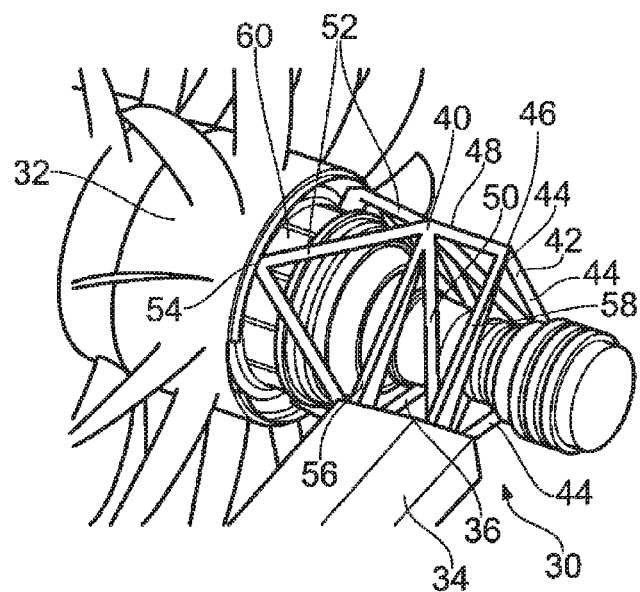
Figures 2B, 3:
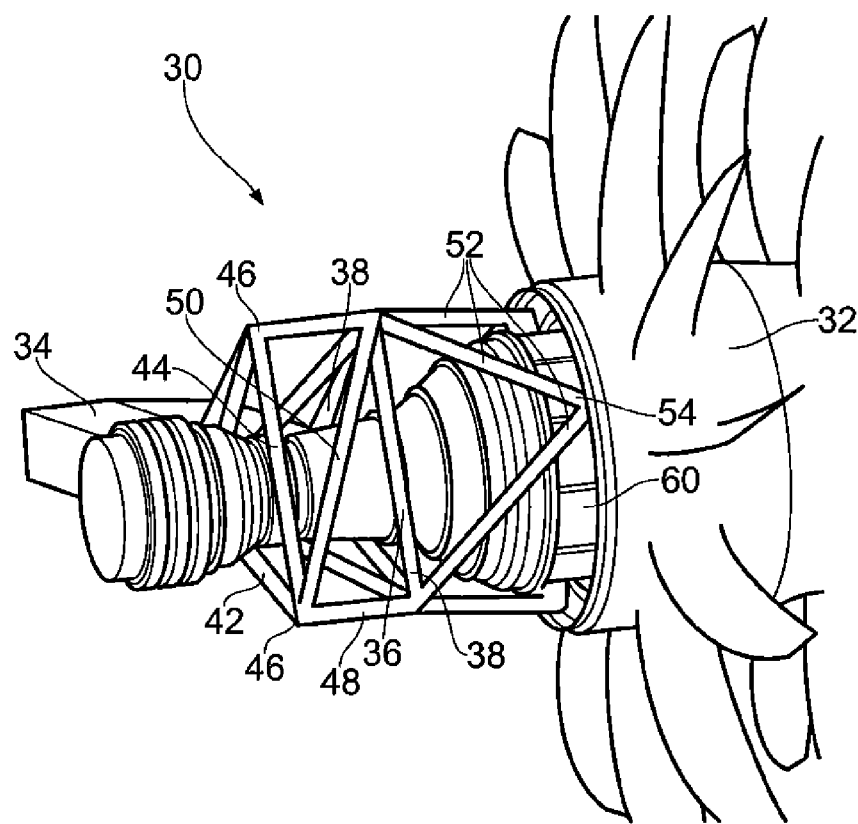

Embodiments of the invention will now be described by way of example only, with reference to the accompanying Figures, in which:

FIG. 1 is a sectional side view of a gas turbine engine having contra-rotating propeller stages;

FIG. 2*a* is a perspective side view showing a mounting system according to an embodiment of the invention;

FIG. 2*b* is a perspective view showing the opposite side of the mounting system of FIG. 2*a*;

FIG. 3 is a front view showing a mounting system according to an embodiment of the present invention.

Referring to FIG. 1, a twin-spooled, contra-rotating propeller gas turbine engine is generally indicated at 10 and has a principal rotational axis 9. The engine 10 comprises a core 11 having, in axial flow series, an air intake 12, a low pressure compressor 14, a high-pressure compressor 15, combustion equipment 16, a high-pressure turbine 17, a low pressure turbine 18, a free power turbine 19 and a core exhaust nozzle 20. A nacelle 21 generally surrounds the core engine 11 and defines the intake 12 and nozzle 20 and a core exhaust duct 22. The engine 10 also comprises two contra-rotating propeller stages 23, 24 attached to and driven by the free power turbine 19 via shafts 26, 27. The free power turbine 19 is shown here as interleaved with the propeller stages 23, 24. In an alternative arrangement the free power turbine is forward of the propeller stages and drives them by a gearbox which may be an epicyclic gearbox. There may then be a main spoked structure between the power turbine and the propeller stages in the region indicated as 28.

The gas turbine engine 10 works in a conventional manner so that air entering the intake 12 is accelerated and compressed by the low pressure compressor 14 and directed into the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high-pressure, low pressure and free power turbines 17, 18, 19 before being exhausted through the nozzle 20 to provide some propulsive thrust. The high-pressure, low pressure and free power turbines 17, 18, 19 respectively drive the high and low pressure compressors 15, 14 and the propellers 23, 24 by suitable interconnecting shafts. The propellers 23, 24 normally provide the majority of the propulsive thrust. In the embodiments herein described the propellers 23, 24 rotate in opposite senses so that one rotates clockwise and the other anti-clockwise around the engine's rotational axis 9.

Referring now to FIGS. 2a and 2b, a mounting system is generally shown at 30. The mounting system 30 is shown mounting an open rotor gas turbine engine 32 to a pylon 34 of an aircraft (not shown). Although not shown here, the pylon 34 extends from a rear portion of the fuselage of the aircraft, substantially horizontally and normal to the fuselage. One pylon 34 extends from each side of the aircraft (i.e. left and right hand pylons). In this embodiment the mounting system 30 provides the only load bearing connection between the gas turbine engine 32 and the pylon 34 and therefore transfers all loads from the gas turbine engine 32 to the pylon 34.

The mounting system 30 comprises a first frame 36 of three elongate members 38 joined at their ends to form an equilateral triangle. As will be appreciated the triangle of the first frame 36 has three vertices 40. Two of the elongate members 38 are provided with several discrete cooperating attachment formations (not shown).

The mounting system 30 further comprises a second frame 42 of three elongate members 44 joined at their ends to form an equilateral triangle. As before the triangle has three vertices 46. The first 36 and second 42 frames are identical.

The first 36 and second 42 frames are axially separated and aligned (i.e. they have the same orientation and a line joining centre points of each frame 36, 42 would run parallel with the main rotational axis of the gas turbine engine 32). Further both first 36 and second 42 frames extend perpendicular to the main rotational axis of the gas turbine engine 32 such that they are parallel with one another. The first frame 36 is located axially downstream of the second frame 42.

Each corresponding pair of vertices of the first 36 and second 42 frames (i.e. vertices of the frames 36, 42 that point in the same compass direction) are bridged and joined by axially extending cross-members 48. As can be seen there are also three bracing members 50, each traversing and joining a pair of non-corresponding vertices of the frames 36, 42.

From each vertex 40 of the first frame 36 extend two diverging frame links 52. The frame links 52 extend in substantially the opposite direction to the cross-members (that is each frame link 52 extends from its vertex 40 in a direction away from the second frame 42). The end of each frame link 52 distal to its corresponding vertex 40 terminates at a joint 54. Each joint 54 comprises the ends of two frame links 52, each joined to different vertices 46. The link system thus forms a cylindrical Warren girder frame.

The elongate members 38, 44 of the frames 36, 42, cross-members 48, bracing members 50 and frame links 52 are all tubular bodies, which together therefore may be considered to form a skeletal framework of triangular shapes.

As can be seen with reference to FIGS. 2a, 2b and 3, the mounting system 30 further comprises first 56 and second 58 elongate spars extending from the pylon 34. The first 56 and second 58 elongate spars are parallel and are axially sepa-rated by the same distance as the first 36 and second 42 frames. Each spar 56, 58 is canted upwards with respect to the pylon 34, therefore extending with dihedral from the pylon 34 and making an angle of approximately 120° to 150° therewith. The underside of each spar 56, 58 is provided with several discrete cooperating attachment formations (not shown).

In use, the first 36 and second 42 frames are positioned about the gas turbine engine 32, each frame 36, 42 being oriented so that it is parallel to a plane perpendicular to the main rotational axis of the gas turbine engine 32. The first 36 and second 42 frames are also located axially so that both are forward of a radially extending projection of a first turbine stage and rearward of a radially extending projection of a final compressor stage. With the first 36 and second 42 frames in this position, the three joints 54 are in contact with and circumferentially spaced about a spoked frame core casing 60 of the gas turbine engine 32. Further the joints 54 are located close to the axial centre of gravity of the gas turbine engine 32 and at structural hardpoints at the end of the spokes of the casing. The mounting system 30 is attached to the gas turbine engine 32 by means of the joints 54 being attached to the core casing 60 via vibration isolators 61. Radial growth of the core casing 60 is in this embodiment accommodated by flexing of the frame links 52 and vibration isolators 61, but in other embodiments bearings may be provided between the joint 54 and casing 60, and between the frame links 52 and first frame 36, to allow articulation. Only the joints 54 come into contact with and are attached to the gas turbine engine 32. None of the elongate members 38, 44, cross-members 48, bracing members 50 or frame links 52 contact or are directly attached to the gas turbine engine 32.

The gas turbine engine 32 is mounted to the pylon by means of engagement of the cooperating attachment formations of each spar 56, 58 with corresponding cooperating attachment formations on an elongate member 38, 44 of each of the first 36 and second 42 frames. Each spar 56, 58 is arranged to contact the respective elongate member 38, 44 along substantially the whole length of the elongate member 38, 44. In alternative embodiments however, contact between the respective elongate member 38, 44 and spar 56, 58 may occur at discrete locations e.g. the vertices of the relevant frame 36, 42. Such contact may for example occur at a minimum of three vertices or may occur at four vertices offering greater redundancy.

Once attached to the pylon 34, the orientation of the gas turbine engine 32 is substantially fixed with respect to the pylon 34 and aircraft (not shown). With the engine 32 attached to the pylon 34, the engine 32 may be considered to consist of two portions; a first portion 62 and a second portion 64 (see FIG. 3) corresponding to the left and right hand sides of the engine 32 when in this attached orientation. The two portions 62, 64 are (when the engine 32 is in its mounted orientation) therefore separated by a vertical plane 66 passing through the centre of the engine 32 and extending in parallel to the rotating axis of the gas turbine engine 32. The triangular arrangement of elongate members 38, 44 of each frame 36, 42 are symmetrical about this plane 66, facilitating left and right hand mounting of the engine 32 on the aircraft. In particular when mounted on one side of the aircraft the cooperating attachment formations on one of the elongate members 38 will be used for engagement with the spar 56 and when mounted on the other side of the aircraft the cooperating attachment formations of the other elongate member 38 will be used for engagement. The same is true of the elongate members 44 of the second frame 42 and the spar

58. The plane 66 passes through one vertex 40, 46 of each frame 36, 42. The elongate members 38, 44 to either side of these vertices 40, 46 are those provided with the cooperating attachment formations.

In this embodiment the plane 66 also passes through the gas turbine engine 32 top and bottom dead centres. Therefore the same engine 32 mounted on left and right hand sides of the aircraft will be symmetrically orientated with respect to its own top and bottom dead centres.

As best seen with reference to FIG. 3 the gas turbine engine 32 can be lowered vertically directly from its position when mounted with the pylon 34 to disengage it therefrom. Further the gas turbine engine 32 can be raised vertically from directly below its position when mounted with the pylon 34 to engage it therewith. It is the attachment of the elongate members 38, 44 with the underside of the respective spars 56, 58 that is significant in permitting these mounting and dismounting actions. The further absence of any structures that would inhibit motions described is also significant.

It will be understood that the invention is not limited to the embodiments above-described and various modifications and improvements can be made without departing from the various concepts described herein. Except where mutually exclusive any of the features may be employed separately or in combination with any other features and the invention extends to and includes all combinations and sub-combinations of one or more features described herein in any form of mounting system.

The invention claimed is:

1. An aircraft comprising:
 a pylon;
 a gas turbine engine attached to the pylon; and
 a mounting system attaching the gas turbine engine to the pylon, the mounting system including:
  a first frame of three elongate members arranged in a triangle, the first frame being arranged such that a core of the gas turbine engine is positioned extending through an area defined between the three elongate members of the first frame, the first frame forming at least part of a load bearing connection between the pylon and the gas turbine engine, the first frame consisting of two portions, each portion respectively corresponding to each side of the gas turbine engine as attached to the pylon at a location of the first frame, the triangle formed by the first frame being symmetrical about a first plane separating the two portions of the first frame; and
  a second frame of three elongate members arranged in a triangle, the second frame being arranged such that the core of the gas turbine engine is positioned extending through an area defined between the three elongate members of the second frame, the second frame forming at least part of the load bearing connection between the pylon and the gas turbine engine, the second frame consisting of two portions, each portion respectively corresponding to each side of the gas turbine engine as attached to the pylon at a location of the second frame, the triangle formed by the second frame being symmetrical about a second plane separating the two portions of the second frame wherein
 the gas turbine engine is attached to the mounting system such that both of the first frame and the second frame are positioned axially forward of a radially extending projection of a first turbine stage in the core of the gas turbine engine.

2. The aircraft according to claim 1, wherein the first plane separating the two portions of the first frame is the same as a plane extending along a rotating axis of the gas turbine engine.

3. The aircraft according to claim 1, wherein the first frame is oriented parallel to a plane perpendicular to a rotating axis of the gas turbine engine.

4. The aircraft according to claim 1, wherein the first frame and the second frame are axially separated and oriented parallel to each other.

5. The aircraft according to claim 1, wherein the mounting system further includes a first elongate spar extending from the pylon and is attached to one of the elongate members of the first frame.

6. The aircraft according to claim 5, wherein the first elongate spar extends in a direction parallel to the one of the elongate members of the first frame to which the first elongate spar is attached.

7. The aircraft according to claim 5, wherein the mounting system is configured such that the first frame is lowered directly vertically when the first elongate spar is disengaged from the first frame, and such that the first frame is raised directly vertically to engage the first elongate spar with the first frame and mount the first frame.

8. The aircraft according to claim 5, wherein the mounting system further includes a second elongate spar extending from the pylon and is attached to one of the elongate members of the second frame.

9. The aircraft according to claim 1, wherein the gas turbine engine is attached to the mounting system such that at least one of the first frame and the second frame is positioned axially rearward of a radially extending projection of a final compressor stage in the core of the gas turbine engine.

10. The aircraft according to claim 1, wherein frame links extend from vertices of the first frame and attach the mounting system to the core of the gas turbine engine.

11. A gas turbine engine comprising:
 a mounting system attaching the gas turbine engine to a pylon of an aircraft, the mounting system including:
  a first frame of three elongate members arranged in a triangle, the first frame being arranged so that a core of the gas turbine engine is positioned extending through an area defined between the three elongate members of the first frame, the first frame being arranged so that the first frame forms at least part of a load bearing connection between the pylon and the gas turbine engine, the first frame consisting of two portions, each portion respectively corresponding to each side of the gas turbine engine as attached to the pylon at a location of the first frame, the triangle formed by the first frame being symmetrical about a first plane separating the two portions of the first frame; and
  a second frame of three elongate members arranged in a triangle, the second frame being arranged so that the core of the gas turbine engine is positioned extending through an area defined between the three elongate members of the second frame, the second frame being arranged so that the second frame forms at least part of the load bearing connection between the pylon and the gas turbine engine, the second frame consisting of two portions, each portion respectively corresponding to each side of the gas turbine engine as attached to the pylon at a location of the second frame, the triangle formed by the second frame being symmetrical about a second plane separating the two portions of the second frame; wherein the gas turbine engine is attached to the mounting system such that both of the first frame and the second frame are positioned axially forward of a radially extending projection of a first turbine stage in the core of the gas turbine engine.

12. An aircraft comprising the gas turbine engine according to claim 11.

* * * * *